United States Patent [19]

Passer et al.

[11] 4,283,622
[45] Aug. 11, 1981

[54] BAR CODE READER

[75] Inventors: Barry E. Passer, Ithaca; George A. Sculley, Endicott, both of N.Y.

[73] Assignee: NCR Corporation, Dayton, Ohio

[21] Appl. No.: 39,013

[22] Filed: May 14, 1979

[51] Int. Cl.³ .................. G06K 7/10; G06K 19/00
[52] U.S. Cl. .................. 235/462; 235/473; 235/487; 235/494; 250/569
[58] Field of Search ............ 235/462, 463, 473, 474, 235/487, 494; 250/466, 468, 469

[56] References Cited

U.S. PATENT DOCUMENTS

| | | | |
|---|---|---|---|
| 3,417,234 | 12/1968 | Sundblad | 235/473 |
| 3,474,234 | 10/1969 | Reiger et al. | 235/473 |
| 3,539,777 | 11/1970 | Rohland | 235/473 |
| 3,673,417 | 6/1972 | Wahli | 235/473 |
| 3,737,628 | 6/1973 | Azure, Jr. | 235/474 |
| 3,746,840 | 7/1973 | Ogland et al. | 235/473 |
| 3,766,364 | 10/1973 | Krecioch et al. | 235/473 |
| 3,809,893 | 5/1974 | Dobras | 235/473 |
| 3,904,110 | 9/1975 | Bottles | 235/474 |
| 3,953,730 | 4/1976 | Henry et al. | 235/473 |
| 4,172,554 | 10/1979 | Clarinval et al. | 235/466 |

Primary Examiner—Daryl W. Cook
Attorney, Agent, or Firm—Wilbert Hawk, Jr.; Richard W. Lavin; J. T. Cavender

[57] ABSTRACT

An optical sensing member for reading a coded member having parallel aligned tracks of data and clocking coded symbols which includes a pair of sensing apertures offset to enable the sensing of the data track to occur out of phase with the sensing of the clocking track. The sensing member includes a housing having a sensing surface in which the offset apertures are located, a light source, a pair of photo-transistors for sensing the tracks of coded symbols and optical fibers for transmitting light from the light source to the tracks of coded symbols and the reflected light to the photo-transistors for the reading of the coded members.

8 Claims, 11 Drawing Figures

FIG. 1
FIG. 2
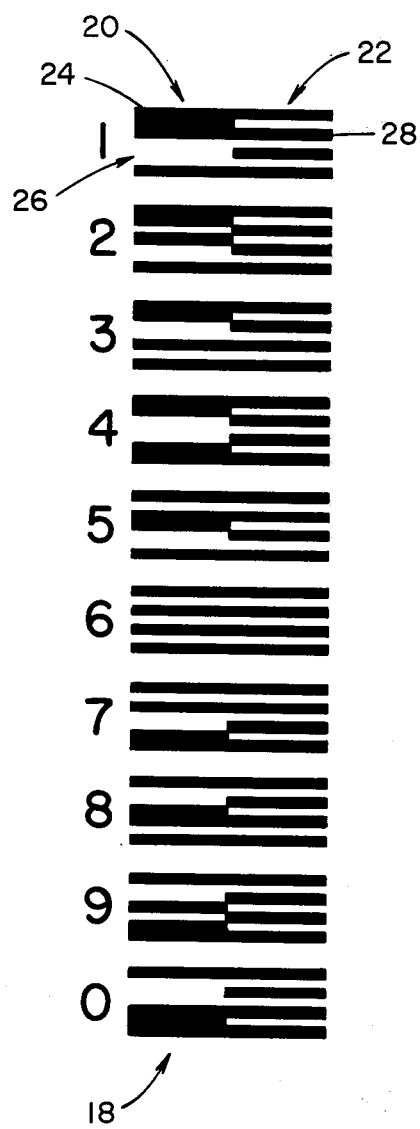
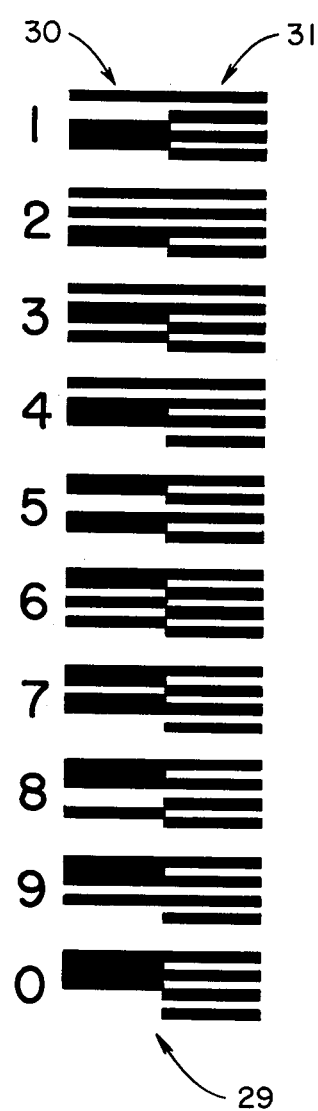

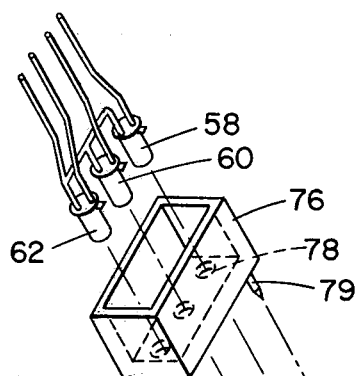
FIG. 7
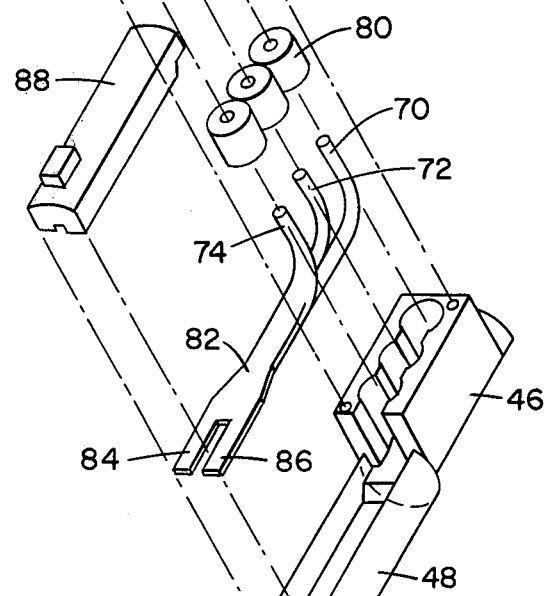
FIG. 8
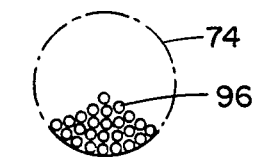
FIG. 9
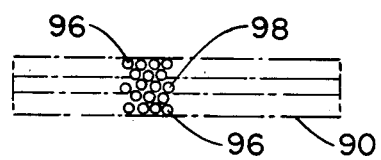

BAR CODE READER

CROSS-REFERENCE TO RELATED APPLICATIONS

CODE SENSING SYSTEM, co-pending application Ser. No. 039,002, filed on even date herewith, invented by Barry E. Passer and George A. Sculley, assigned to the NCR Corporation;

BAR CODE SYMBOLS, co-pending application Ser. No. 038,999, filed on even date herewith, invented by Barry E. Passer and George A. Sculley, assigned to the NCR Corporation.

BACKGROUND OF THE INVENTION

This invention relates to transition code processing systems and more particularly, to an optical reader for generating signals representing information stored in the form of black and white coded bars.

In present-day data processing systems, the use of bar code symbols on labels or articles as a means for acquiring data at a point of sale is wellknown. In reading these bar code labels, it is necessary to provide a clock pulse or other type of synchronizing signal in order that the information be properly entered from the sensing device to the utilization device. It is further necessary to provide an accurate time relationship between the movement of the sensing device with respect to the bar code symbols and the clock pulse in order for the information received to be accurately decoded. To meet these requirements, prior bar code recognition systems such as disclosed in U.S. Pat. Nos. 2,952,008 and 3,409,760 provide a separate clock or timing symbol adjacent the bar code symbol, both symbols being sensed simultaneously. Such an arrangement provides the clock pulses which bear a direct relationship to the information to be sensed. However, the requirement for controlled movement of the sensing device with respect to the bar code symbols is still important. When the movement between the sensing device and the bar code symbols was intermittent, the arrangement of prior bar code symbols and their associated sensing members was found inadequate to functionally operate under this intermittent condition. It is therefore the primary object of this invention to provide an optical sensing means for reading a unique coding arrangement in which a plurality of coded symbols are capable of producing information independent of the speed of movement of the coded symbols past the sensing device while still being self-clocking. It is a further object of this invention to provide an optical sensing means which is inexpensive to manufacture and simple in construction.

SUMMARY OF THE INVENTION

In order to fulfill these objects, there is provided an optical sensing device for reading a bar code label comprising a plurality of bar code symbols arranged to provide a data channel and a clocking channel which channels are sensed by the sensing device when the label is moved past the sensing member by an intermittent drive member. The sensing device includes a pair of sensing apparatus which are offset to each other for reading the data and clock channels to generate the appropriate signals used in outputting the data to a utilization device in which the label is intermittently driven past the sensing device.

BRIEF DESCRIPTION OF THE DRAWINGS

Additional advantages and features of the present invention will become apparent and fully understood from a reading of the following description taken together with the annexed drawings.

FIG. 1 is a graphic representation of the bar code symbols together with its representative coded character in accordance with the present invention.

FIG. 2 is a graphic representation of the end-of-code bar code symbol together with its representative coded character in accordance with the present invention.

FIG. 7 is an exploded view of the sensing member in accordance with the present invention.

FIG. 8 is a cross-sectional view of one of the optical channels in which are located the optical fibers for transmitting the light rays generated during a sensing operation.

FIG. 9 is an end view of one of the apertures in the contact surface of the sensing member showing the arrangements of the optical fibers for transmitting and receiving the light rays generated during a sensing operation.

DESCRIPTION OF THE PREFERRED EMBODIMENT

Figure 3:
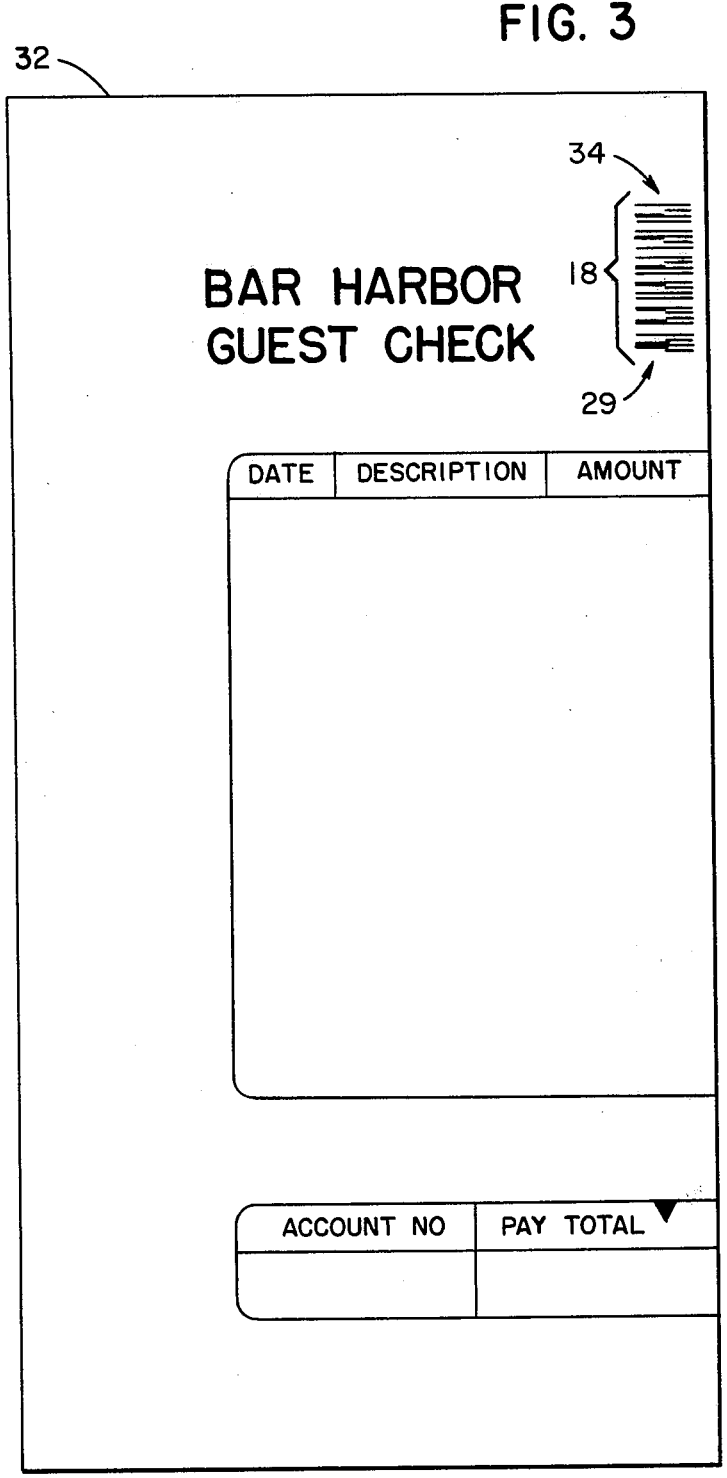
FIG. 3 is a plan view of the record member on which is located a bar code label.

Referring now to FIG. 1, there is shown a graphic representation of the coded indicia such as bar code symbols utilized in the present invention. As shown, each bar code symbol, generally indicated by the numeral 18, includes a character bar code symbol 20 and a clock bar code symbol 22. The character bar code symbols are arranged to be representative of each of the numerical characters 0–9 inclusive and form a data channel when located on an item to be processed. Each of the bar code symbols 20 comprises a series of black 22 and white 24 bars of various thicknesses with each of the bar code symbols 20 being composed of seven equal width data elements called modules, wherein each module may be white or black. In sensing the bar code symbols 20 and 22, each white module or space is assigned the value of 0 while a black module is assigned the value of 1 in a manner that is well-known in the art. It will be noted that the first and last bar of each bar code symbol 20 is black, which characteristic is used in the control of the operation of a motor drive mechanism in a manner to be described hereinafter. By using binary bits for the black and white module representations, each bar code symbol 20 is arranged to provide a 7-bit pattern. Thus, the decimal or character 1 may be represented in the bar code symbols 20 of FIG. 1 by the 7-bit pattern 1110001. In keeping with this format, the decimal 1 should be comprised of a black bar of a 3-bit width, followed by a white bar or space of a 3-bit width and a 1-bit wide bar. The binary representation of each of the bar code symbols 20 of FIGS. 1 and 2 is fully disclosed in the previously-cited co-pending application of Passer et al., Ser. No. 039,002, which application is fully incorporated into this application by reference.

As previously described, associated with each of the data bar code symbols 20 (FIG. 1) is a second bar code symbol 22 representing clock signals and comprising four equally-spaced black bars 28, each of which functions as a bit location reference for the corresponding bits of the numerical character in the data symbol 20 in a manner that will be described more fully hereinafter. This bar code arrangement taken in conjunction with its associated bar code symbol 20 allows each coded character to be self-clocking and thereby independent of the speed of the movement of the bar code label past the sensing member. While the bar code symbols 20 and 22 of FIG. 1 are shown attached, it is obvious that they may be separated and still function for their intended purpose, provided that the code symbols 20 and 22 remain horizontally aligned as shown.

Referring now to FIG. 2, there is shown a graphic representation of a second set of bar code symbols generally indicated by the numeral 29 and which are used as the last or end-of-character bar code symbol of a bar code label. Each of the end-of-code symbols 29 include a character bar code symbol 30 which is similar to its corresponding character bar code symbols 20 (FIG. 1) in that the first bar is always black. The remaining bar positions 2-7 inclusive are inverted, that is, a 1 bit appears in the end-of-code character symbol 29 where a 0 bit was in the same location in the corresponding character bar code symbol 20. Reference should be made to the previously cited co-pending application of Passer et al., Ser. No. 039,002, for the bit arrangement of the bar code symbols 18 and 29. It should be noted that in either case, each bar code symbol includes four binary bit 1's which characteristic is used as a parity check. The end-of-code clock bar code symbols 29 have an associated clock bar code symbol 31 (FIG. 2) similar to that of the clock bar code symbols 22 (FIG. 1) and which functions in the same manner.

Referring now to FIG. 3, there is shown a plan view of a record member 32 such as a check member which is issued by a motel or hotel and on which the customer's charges are printed. Upon registration, the customer is assigned a check member 32 on which is printed a bar code label 34 which may comprise any number of character bar code symbols 18 (FIG. 1) together with an end-of-code bar code symbol 29 (FIG. 2) comprising an account number. Any charges incurred by the customer are printed on the check by inserting the check into a printing station located in a terminal device and inserting the amount of the charge into a printing mechanism through a keyboard in a manner that is well-known in the art. A motor drive member in the terminal device will drive the check member 32 to a position adjacent the printing members in the printing mechanism which prints the amount of the charge on the check member 32. During an initial movement of the check member 32 by the drive member, a sensing member located in the printing station will read the bar code label 34, enabling the terminal device to identify the customer's account number so that the amount being printed can be added to a running total of the entries on the check member. At check-out time, the total amount due is printed on the check for payment by the customer.

Figure 4:
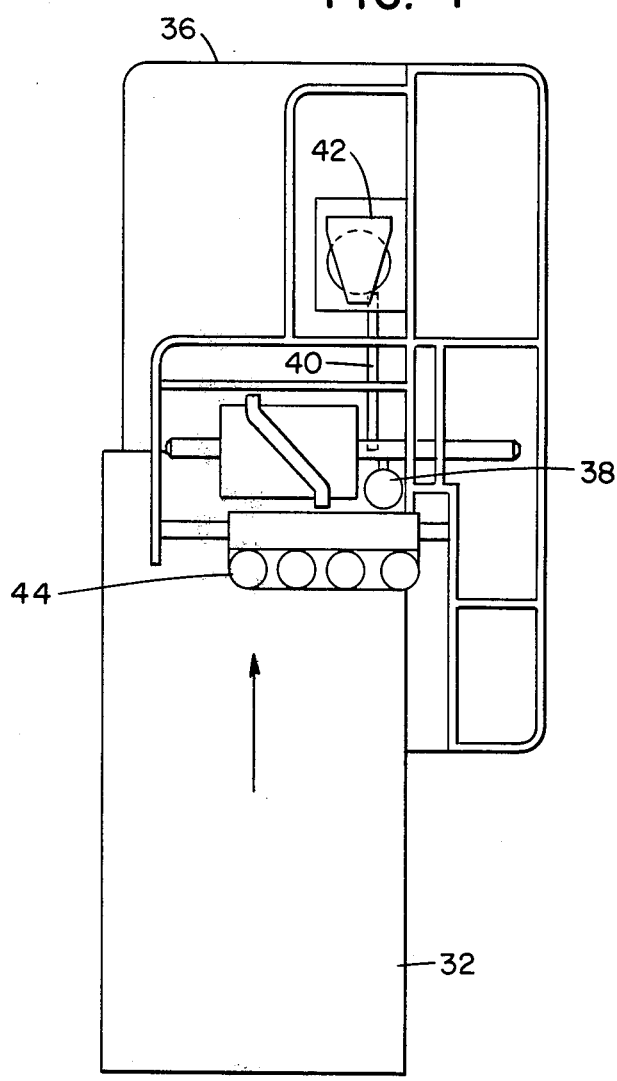
FIG. 4 is a top view of the printing station in which the record member of FIG. 3 is positioned for a printing operation.

Referring now to FIG. 4, there is shown a top view of the printing station located in the terminal device which includes a table 36 on which is positioned the check member 32 which is driven inwardly in the direction as indicated by the arrow by a drive mechanism past a sensing assembly 38 and into engagement with a stop arm 40 selectively positioned by a solenoid 42. As described fully in the co-pending application of Passer et al. Ser. No. 039,002, the check member 32 will be driven inwardly during which time the sensing assembly 38 will read the bar code label 34 (FIG. 3) until it reads the end-of-code bar code symbol 29 at which time the driving mechanism is deenergized. A printing mechanism 44 positioned adjacent the top of the check member 32 is then operated to print out the required data on the check member. This sequence of operations is repeated each time a charge is to be made against the customer's account number and printed on the check member 32.

Figure 5:
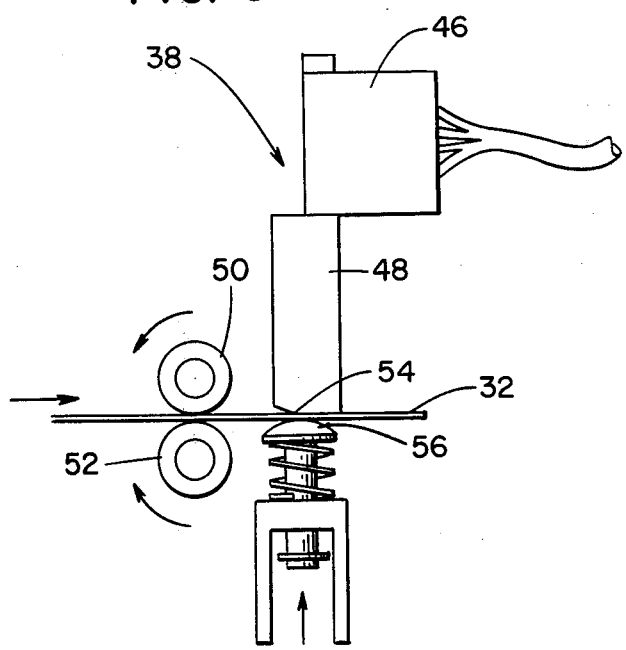
FIG. 5 is a side view of a portion of the printing station shown in FIG. 4 in which the record member is positioned adjacent the sensing member.

Referring now to FIG. 5 there is shown a side view of a portion of the printing station of FIG. 4 showing the sensing assembly 38 positioned against the check member 32. The sensing assembly 38 includes an upper housing 46 in which are located the photo-transistors and the light-emitting diode used in the sensing operation and a lower housing 48 in which are located the plurality of optical fibers for transmitting and receiving light rays directed at the surface of the check member 32. The check member 32 is engaged by a pair of drive rollers 50 and 52 which operate to drive the check member 32 in the direction as indicated by the arrows. The check member 32 is urged into engagement with the contact surface 54 (FIGS. 5 and 11) of the lower housing 48 by a spring-urged compensator member 56 during which time the sensing assembly 38 will scan and read the bar code label 34 on the check member 32 when driven by operation of the drive rollers 50 and 52.

Figure 6:
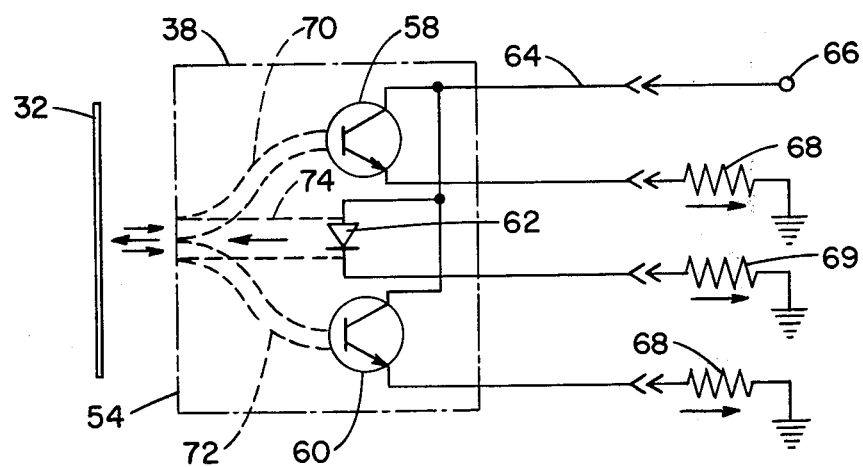
FIG. 6 is a schematic representation of the arrangement of the sensing elements in the sensing member.

Referring now to FIG. 6 there is shown a schematic representation of the sensing elements included in the sensing assembly 38 comprising a pair of photo-transistors 58 and 60 together with a light-emitting diode 62. The collectors of the photo-transistors 58 and 60 together with one side of the diode 62 are connected over line 64 to a suitable voltage supply 66 in which current will flow through the lines 64, the photo-transistors 58 and 60 and through a dropping resistor 68 to ground, thereby enabling the phototransistors to output an analog signal in response to receiving light rays transmitted through a plurality of optical fibers located in an associated channel 70 and 72 respectively, the ends of which are positioned in apertures located in the contact face 54 of the sensing assembly 38. The light rays transmitted through the channels 70 and 72 are generated by the energizing of the light-emitting diode 62 through the dropping resistor 69 in the same manner as the photo-transistors 58 and 60 in which the light rays are transmitted through a plurality of optical fibers located in a channel 74 and which are directed at a bar code label located on the check member 32.

Figure 11:
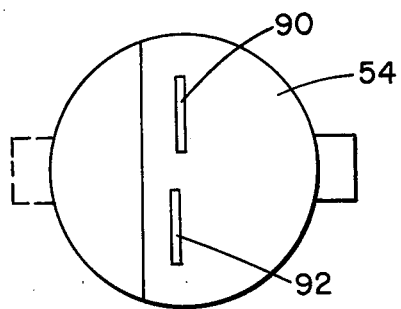
FIG. 11 is a plan view of the contact surface of the sensing member showing the off-set relationship of the two sensing apertures located therein.

Referring now to FIG. 7, there is shown an exploded view of the sensing assembly 38 of the present embodiment which includes the diode 62, and the phototransistors 58 and 60. The diode 62 and the phototransistors 58 and 60 are located in a housing 76 by being mounted within an associated aperture 78 located in the floor of the housing 76 and in which is also positioned the ends of their associated channels 70-74 inclusive. Each of the channels 70-74 inclusive is secured to the housing 76 by a terminal 80. The housing 76 is then secured to the upper housing 46 of the sensor assembly by any suitable fastening means such as screws 79 which positions a lower channel 82 formed by the termination portions of the channels 70-74 inclusive in the lower housing 48. As shown, the channel portion 82 is formed into two leg segments 84 and 86 whose ends are positioned adjacent the contact face 54 of the lower housing 48. A cap member 88 locates the channel portion 82 within the lower housing member 48 and when secured to the lower housing member 48 forms the apertures 90 and 92 (FIG. 11) with a pair of corresponding slots 94 located in the housing member 48. As shown in FIG. 11, the open end of the leg segment 84 positioned in the aperture 90 is offset with respect to the open end of the leg segment 86 positioned in the aperture 92.

Located in each of the channels 70-74 inclusive (FIG. 7) are a plurality of optical fibers which extend from a position adjacent the photo-transistors 58 and 60 and the diode 62 to a position adjacent the open end of the leg segments 84 and 86 in a manner that is well-known in the art. As shown in FIGS. 8 and 9 the optical fibers 96 positioned within the channel 74 associated with the light-emitting diode 62 are orientated on the outside of the optical fibers 98 when located in the open end of the leg segments 84 and 86 positioned in the apertures 90 and 92. The optical fibers 96 surround the optical fibers 98 located in the channels 70 and 72, the latter transmitting the reflected light rays from the face of the bar code label 34 to their associated photo-transistors 58 and 60. As shown in FIG. 11 and as previously described, the aperture 90 is offset to the aperture 92 by a predetermined amount which in this case is one half the width of a bar element 28 (FIG. 1). In reading a bar code symbol 18 (FIG. 1), the optical fibers 98 in the aperture 92 will transmit the light reflected from the character bar code symbol 20 while the optical fibers 96 in the aperture 90 will scan the clock bar code symbols 22 in a manner as fully described in the previously-cited co-pending application of Passer et al., Ser. No. 039,002.

Figure 10:
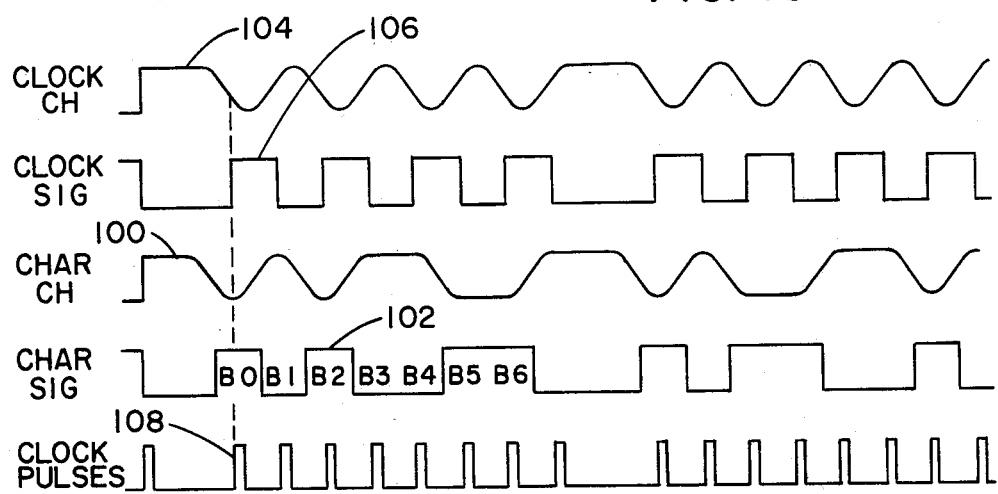
FIG. 10 shows a plurality of waveforms generated during a sensing operation of the sensing member in accordance with the present invention.

Referring now to FIG. 10, there is shown the signals generated by the photo-transistors 58 and 60 in response to receiving the light rays transmitted by the optical fibers in the channels 70 and 72 as the result of sensing a bar code label 34 (FIG. 3). As shown, the photo-transistor 60 will output the analog waveform signal 100 which signal is digitized to produce the square waveform signal 102 in a manner as fully described in the previously-cited Passer et al. co-pending application Ser. No. 039,002. The photo-transistor 58 will generate the clock analog waveform signal 102 which signal is also digitized to produce the square waveform signal 104. A number of clock pulses 108 are generated on the rising and falling edges of the clock waveform signal 106. It will be seen that the clock pulses 108 occur in the middle of the waveform signal 102 which corresponds to one of the bit positions B0-B6 inclusive in the bar code symbol 18, which signal is used to insure that the character data being generated by the photo-transistor 60 is an accurate representation of the data being sensed.

Although the invention has been described and illustrated with a certain degree of particularity, it is understood that the present disclosure has been made only by way of example, and that numerous changes in the details of construction and the combination and arrangements of parts may be resorted to without departing from the spirit and scope of the invention as hereinafter claimed.

What is claimed is:

1. In combination with a record member having first and second parallel tracks of encoded indicia with each indicia of each track being horizontally aligned with the corresponding indicia in the other track, a member for sensing both tracks of indicia upon movement of the record member past the sensing member comprising:
   a housing member having a scanning surface;
   a pair of apertures located in said scanning surface each associated with one of the tracks of coded indicia wherein the aperture associated with the first track of indicia being located in said scanning surface offset along the path of movement of the record member to the other aperture;
   a source of light mounted in said housing member;
   a plurality of light sensors mounted in said housing member each associated with one of the apertures in the scanning surface of the housing member;
   and light-transmitting means located within the housing member and being in communication with the source of light, the light sensors, and the apertures whereby light is transmitted from the light source to the tracks of coded symbols on a record member positioned adjacent the apertures and reflected back to the light sensors.

2. The sensing member of claim 1 in which said housing member includes a supporting surface supporting said light source and said sensors, said light-transmitting means includes a plurality of channel members each associated with one of said light sensors and said light source, each of said channel members having one end secured to said supporting surface and the other end formed with the other channel members to produce a single channel member associated with the light source and one of said light sensors located within one of said apertures, and light conveying means located in each channel member enabling light to be transmitted from the light source to the tracks of coded indicia on the record member positioned adjacent the apertures and to be reflected back to the light sensors.

3. The sensing member of claim 2 in which said light conveying means comprises optical fibers with the optical fibers transmitting light from said light source being orientated in each of the apertures to surround the optical fibers transmitting the reflected light from the record member to the light sensors.

4. The sensing member of claim 3 in which the coded indicia of said second track have a constant width and said first aperture being off-set to said second aperture a distance equal to one-half of the width of a coded indicia of said second track.

5. In a data processing apparatus having a supporting surface and drive means located in said supporting surface for moving a record member positioned thereon along a scanning path, the combination including:
   a record member having data and clocking tracks of coded indicia with each indicia in the clocking track being horizontally aligned with a corresponding indicia in the data track, said record member positioned on the supporting surface and driven by the drive means along said scanning path;
   and an optical code reader mounted in the data processing apparatus adjacent said supporting surface for scanning aligned indicia in said tracks of coded indicia, said optical reader comprising a housing member having a scanning surface positioned adjacent the supporting surface;

means positioned adjacent said scanning surface for urging said record member into engagement with said scanning surface;

a pair of apertures located in said scanning surface each associated with one of the tracks of coded indicia wherein the aperture associated with said data tracks being located in said scanning surface off-set along said scanning path to the other aperture;

a source of light mounted in said housing;

a plurality of light sensors mounted in said housing each associated with one of the apertures in the scanning surface of the housing;

and light-transmitting means positioned within the housing and extending between the source of light and the light sensors and the apertures whereby light is transmitted from the light source to the tracks of coded indicia on a record member positioned adjacent the aperture and reflected back to the light sensors.

6. The apparatus of claim 5 in which said housing member includes a supporting surface supporting said light source and said sensors, said light-transmitting means include a plurality of channel members each associated with one of said light sensors and said light source, each channel member having one end secured to said supporting surface and the other end formed with the other channel members to produce a channel member associated with the light source and one of said light sensors located within one of said apertures, and light conveying means located in each channel member enabling light to be transmitted from the light source to the tracks of coded indicia on the record member positioned adjacent the apertures and to be reflected back to the light sensors.

7. The apparatus of claim 6 in which said light conveying means comprises optical fibers with the optical fibers transmitting light from said light source means being orientated in each of the apertures to surround the optical fibers transmitting the reflected light from the coded indicia to the light sensors.

8. The apparatus of claim 7 in which the coded indicia of said clocking track have a constant width and said first aperture being off-set to said second aperture a distance equal to one-half of the width of a coded indicia of said clocking track.

* * * * *